(12) United States Patent
Taguchi et al.

(10) Patent No.: US 8,967,660 B2
(45) Date of Patent: Mar. 3, 2015

(54) VEHICLE CURTAIN AIRBAG DEVICE

(71) Applicants: Hiroyuki Taguchi, Toyota (JP); Osamu Fukawatase, Miyoshi (JP)

(72) Inventors: Hiroyuki Taguchi, Toyota (JP); Osamu Fukawatase, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/961,039

(22) Filed: Aug. 7, 2013

(65) Prior Publication Data

US 2014/0042732 A1 Feb. 13, 2014

(30) Foreign Application Priority Data

Aug. 10, 2012 (JP) .................. 2012-178772

(51) Int. Cl.
*B60R 21/232* (2011.01)
*B60R 21/233* (2006.01)
*B60R 21/231* (2011.01)
*B60R 21/235* (2006.01)

(52) U.S. Cl.
CPC ............. *B60R 21/233* (2013.01); *B60R 21/232* (2013.01); *B60R 2021/23107* (2013.01); *B60R 21/23138* (2013.01); *B60R 2021/23547* (2013.01); *B60R 2021/23308* (2013.01)
USPC ...................... 280/729; 280/730.2; 280/743.1

(58) Field of Classification Search
CPC ................ B60R 21/232; B60R 21/233; B60R 21/23138; B60R 21/231; B60R 2021/23107; B60R 2021/23547
USPC .............. 280/729, 730.2, 743.1, 730.1, 728.1
See application file for complete search history.

(56) References Cited

U.S. PATENT DOCUMENTS

2008/0129023 A1* 6/2008 Heigl et al. ................ 280/730.1
2010/0032930 A1 2/2010 Yamamura et al.

FOREIGN PATENT DOCUMENTS

| JP | H6-239195 A | 8/1994 |
|---|---|---|
| JP | 2001-055108 A | 2/2001 |
| JP | 2005-271755 A | 10/2005 |
| JP | 2007-153224 A | 6/2007 |
| JP | 2008-001197 A | 1/2008 |
| JP | 2008-006895 A | 1/2008 |
| JP | 2008-284904 A | 11/2008 |
| JP | 2010-036805 A | 2/2010 |
| JP | 2012-056543 A | 3/2012 |
| JP | 2012-096780 A | 5/2012 |

* cited by examiner

*Primary Examiner* — Keith Frisby
(74) *Attorney, Agent, or Firm* — Gifford, Krass, Sprinkle, Anderson & Citkowski, P.C.

(57) ABSTRACT

A vehicle curtain airbag device is provided including: a curtain airbag including a main chamber that inflates and deploys to a vehicle width direction inside of a driving-seat-side side window due to being supplied with gas from an inflator installed to a vehicle, a delay chamber that is provided at a vehicle front-rear direction front side of the main chamber, and that completes inflation and deployment later than the main chamber upon receipt of the gas supply, and a sub chamber that is disposed on the vehicle width direction inside of the main chamber and that inflates and deploys so as to block off a gap formed between the main chamber and a driver's seat airbag that is inflated and deployed from a steering wheel; and a controller that inflates and deploys the driver's seat airbag and actuates the inflator in the event of a small overlap collision.

8 Claims, 5 Drawing Sheets

VEHICLE CURTAIN AIRBAG DEVICE

CROSS-REFERENCE TO RELATED APPLICATION

This application is based on and claims priority under 35 USC 119 from Japanese Patent Application No. 2012478772 filed on Aug. 10, 2012, the disclosure of which is incorporated by reference herein.

BACKGROUND

1. Technical Field

The present invention relates to a vehicle curtain airbag device.

2. Related Art

Vehicle curtain airbag devices are known wherein, in the event of a side-on collision, a curtain airbag is inflated and deployed along a side window from a vehicle width direction outside end portion of a roof headlining, thereby protecting the head of a seated occupant (see for example Japanese Patent Application Laid-Open (JP-A) No. 2008-006895, JP-A No. 2012-096780, JP-A No. 06-239195, JP-A No. 2007-153224, JP-A No. 2001-055108, and JP-A No. 2008-284904).

In the above, JP-A No. 2008-006895 discloses technology wherein a curtain airbag is configured with an end portion side inflation portion formed as a separate chamber to the vehicle front side of a general inflation portion, with the end portion side inflation portion partitioned from the general inflation portion by a partitioning portion. A rear end portion of a tension cloth that couples together the general inflation portion and a front pillar is joined to the partitioning portion. According to this configuration, during inflation and deployment the end portion side inflation portion is pushed out towards the vehicle width direction inside by the tension cloth, bearing and arresting the head of a seated occupant that is moving under inertia towards the vehicle diagonal front outside in the event of an oblique collision.

JP-A No. 2012-096780 discloses technology wherein a curtain airbag is provided with a front chamber to the vehicle front side of an inflation region, the front chamber partitioned from the inflation region by a seam portion. A cloth shaped position retention portion is provided at the vehicle width direction inside of the front chamber and a main chamber of the inflation region. According to this configuration, the position retention portion retains the front chamber in a state further towards the vehicle width direction inside than the main chamber in the event of for example a rollover. As a result, the distance between the head of a seated occupant and the front chamber can be reduced, enabling early restraint of the head of the seated occupant.

However, although the technology disclosed in JP-A No. 2008-006895 may be expected to be effective in an oblique collision, there is room for improvement from the perspective that it is difficult to also achieve occupant protection in the event of a rollover. In the technology disclosed in JP-A No. 2012-096780, there is room for improvement with respect to what are referred to as small overlap collisions, that have recently been the focus of attention, of collisions with a barrier disposed at the vehicle width direction outside of a front side member. Namely, in the event of a small overlap collision the driver attempts to move under inertia towards the vehicle diagonal front outside. Depending on such factors as the position of the seat, it is conceivable that the head of the driver could move under inertia into a gap between a driver's seat airbag and the curtain airbag, an issue to which no particular consideration is given in the technology disclosed in JP-A No. 2012-096780.

In consideration of the above issues, an object of the present invention is to obtain a vehicle curtain airbag device capable of both securing occupant protection performance in the event of a rollover and securing occupant protection performance in the event of a small overlap collision.

SUMMARY

A vehicle curtain airbag device according to a first aspect includes a curtain airbag including a main chamber that inflates and deploys to a vehicle width direction inside of a driver's seat-side side window due to being supplied with gas from an inflator installed to a vehicle, a delay chamber that is provided at a vehicle front-rear direction front side of the main chamber, and that completes inflation and deployment later than the main chamber upon receipt of the gas supply, and a sub chamber that is disposed on the vehicle width direction inside of the main chamber and that inflates and deploys so as to block off a gap formed between the main chamber and a driver's seat airbag that is inflated and deployed from a steering wheel; and a controller that inflates and deploys the driver's seat airbag and actuates the inflator in the event of a small overlap collision.

A vehicle curtain airbag device according to a second aspect is the vehicle curtain airbag device of the first aspect wherein the sub chamber is disposed so as to straddle the main chamber and the delay chamber, and the sub chamber is configured so as to inflate and deploy to take a reaction force from the delay chamber.

A vehicle curtain airbag device according to a third aspect is the vehicle curtain airbag device of either the first aspect or the second aspect wherein the sub chamber and the main chamber are in communication with each other through a first flow path.

A vehicle curtain airbag device according to a fourth aspect is the vehicle curtain airbag device of the third aspect wherein the sub chamber and the delay chamber are in communication with each other through a second flow path.

A vehicle curtain airbag device according to a fifth aspect is the vehicle curtain airbag device of the fourth aspect wherein a flow path cross-section dimension of the second flow path is set larger than a flow path cross-section dimension of the first flow path.

A vehicle curtain airbag device according to a sixth aspect is the vehicle curtain airbag device of the first aspect wherein the sub chamber is integrally pocket woven with the main chamber and the delay chamber using a one-piece woven method.

A vehicle curtain airbag device according to a seventh aspect is the vehicle curtain airbag device of the first aspect wherein: when the curtain airbag is opened out flat as a single body, the sub chamber is formed at an opposite side of a lower edge of the main chamber and the delay chamber to the main chamber and the delay chamber; and the sub chamber is folded over at a lower edge side of the main chamber, the delay chamber or both the main chamber and the delay chamber, with an upper edge side of the sub chamber fixed to the vehicle body side together with an upper edge side of the main chamber and the delay chamber, such that the sub chamber is disposed at the vehicle width direction inside of the main chamber and the delay chamber when the curtain airbag has been inflated and deployed.

According to the first aspect, in the event of a small overlap collision, the head of an occupant seated in the driver's seat attempts to move under inertia towards the vehicle diagonal front outside (front pillar side). In the present invention, in the event of a small overlap collision the controller inflates and deploys the driver's seat airbag and also actuates the inflator of the vehicle curtain airbag device. The inflator accordingly generates gas, and the main chamber is inflated and deployed to the vehicle width direction inside of the driver's seat-side side window on receipt of the gas supply. Moreover, on receipt of the gas supply from the inflator, the sub chamber disposed at the vehicle width direction inside of the main chamber is inflated and deployed so as to block off the gap formed between the driver's seat airbag and the main chamber. The head of the occupant seated in the driver's seat is accordingly borne and arrested by the sub chamber even when the head moving under inertia towards the vehicle diagonal front outside enters the gap formed between the driver's seat airbag and the main chamber.

In the event of a rollover, the delay chamber provided at the vehicle front-rear direction front side of the main chamber completes inflation and deployment later than the main chamber. Accordingly, in the event of a rollover, the inflated and deployed state of the delay chamber is maintained, thereby preventing or suppressing the occupant seated in the driver's seat from being ejected from the vehicle.

According to the second aspect, the sub chamber is disposed so as to straddle the main chamber and the delay chamber, such that the sub chamber does not get inserted into the gap between the driver's seat airbag and the main chamber, and the sub chamber blocks off the gap from the vehicle front side. Large displacement of the driver's seat airbag towards the vehicle width direction inside caused by the sub chamber accordingly does not occur. Moreover, since the sub chamber is inflated and deployed taking reaction force from the delay chamber, the rate of acceleration of the head of the seated occupant can be sufficiently slowed.

According to the third aspect, the sub chamber and the main chamber are in communication with each other through the first flow path. The sub chamber is accordingly inflated and deployed due to a portion of the gas that has been supplied to the main chamber being supplied to the sub chamber through the first flow path. The time taken for inflation and deployment of the sub chamber to complete can accordingly be varied by setting the flow path cross-section dimension of the first flow path.

According to the fourth aspect, the sub chamber and the delay chamber are in communication with each other through the second flow path. Accordingly, a portion of the gas that has been supplied into the delay chamber can also be supplied into the sub chamber through the second flow path.

According to the fifth aspect, the flow path cross-section dimension of the second flow path is set larger than the flow path cross-section dimension of the first flow path. Thus, in addition to the operation and advantageous effects obtained in a small overlap collision, it is possible to secure an escape space for the gas in the event of a side-on collision with for example a pole or a barrier. Namely, in the event of a side-on collision with a pole or a barrier, the gas inside the main chamber is allowed to escape into the sub chamber through the first flow path, and gas inside the sub chamber can moreover efficiently escape into the delay chamber through the second flow path.

According to the sixth aspect, the sub chamber is integrally pocket woven with the main chamber and the delay chamber using a one-piece woven method. Relative movement of the sub chamber with respect to the main chamber and the delay chamber accordingly does not occur. The seated occupant can accordingly obtain an effective reaction force from the sub chamber. Moreover, according to the present invention the manufacture of the curtain airbag is easy and gas leakage is not liable to occur.

According to the seventh aspect, when the curtain airbag is opened out flat as a single body, the sub chamber is formed at an opposite side of the lower edge of the main chamber and the delay chamber to the main chamber and the delay chamber. The sub chamber is folded over at a lower edge side of the main chamber, the delay chamber or both the main chamber and the delay chamber, with the upper edge side of the sub chamber fixed to the vehicle body side together with the upper edge side of the main chamber and the delay chamber. The present invention is accordingly of simple manufacture, and gas leakage is not liable to occur.

Advantageous Effects of the Invention

As explained above, the vehicle curtain airbag device according to the first aspect exhibits the excellent advantageous effect whereby occupant protection performance can be secured in the event of a rollover and occupant protection performance can also be secured in the event of a small overlap collision.

The vehicle curtain airbag device according to the second aspect exhibits the excellent advantageous effect whereby protection performance with respect to the head of a seated occupant can be improved whilst maintaining good performance of the driver's seat airbag.

The vehicle curtain airbag device according to the third aspect exhibits the excellent advantageous effect whereby the sub chamber can be inflated and deployed in an appropriate manner whilst swiftly inflating and deploying the main chamber.

The vehicle curtain airbag device according to the fourth aspect exhibits the excellent advantageous effect whereby the sub chamber can be swiftly inflated and deployed.

The vehicle curtain airbag device according to the fifth aspect exhibits the excellent advantageous effect whereby in the event of a side-on collision with for example a pole or a barrier, the reaction force received by head of a seated occupant from the main chamber can be effectively reduced.

The vehicle curtain airbag device according to the sixth aspect exhibits the excellent advantageous effect whereby a sufficient reaction force can be obtained from the sub chamber in the event of a small overlap collision, and the manufacturing cost of the curtain airbag can be reduced whilst obtaining good rollover performance.

The vehicle curtain airbag device according to the seventh aspect exhibits the excellent advantageous effect whereby the manufacturing cost of the curtain airbag can be reduced whilst obtaining good occupant protection performance in the event of a small overlap collision.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
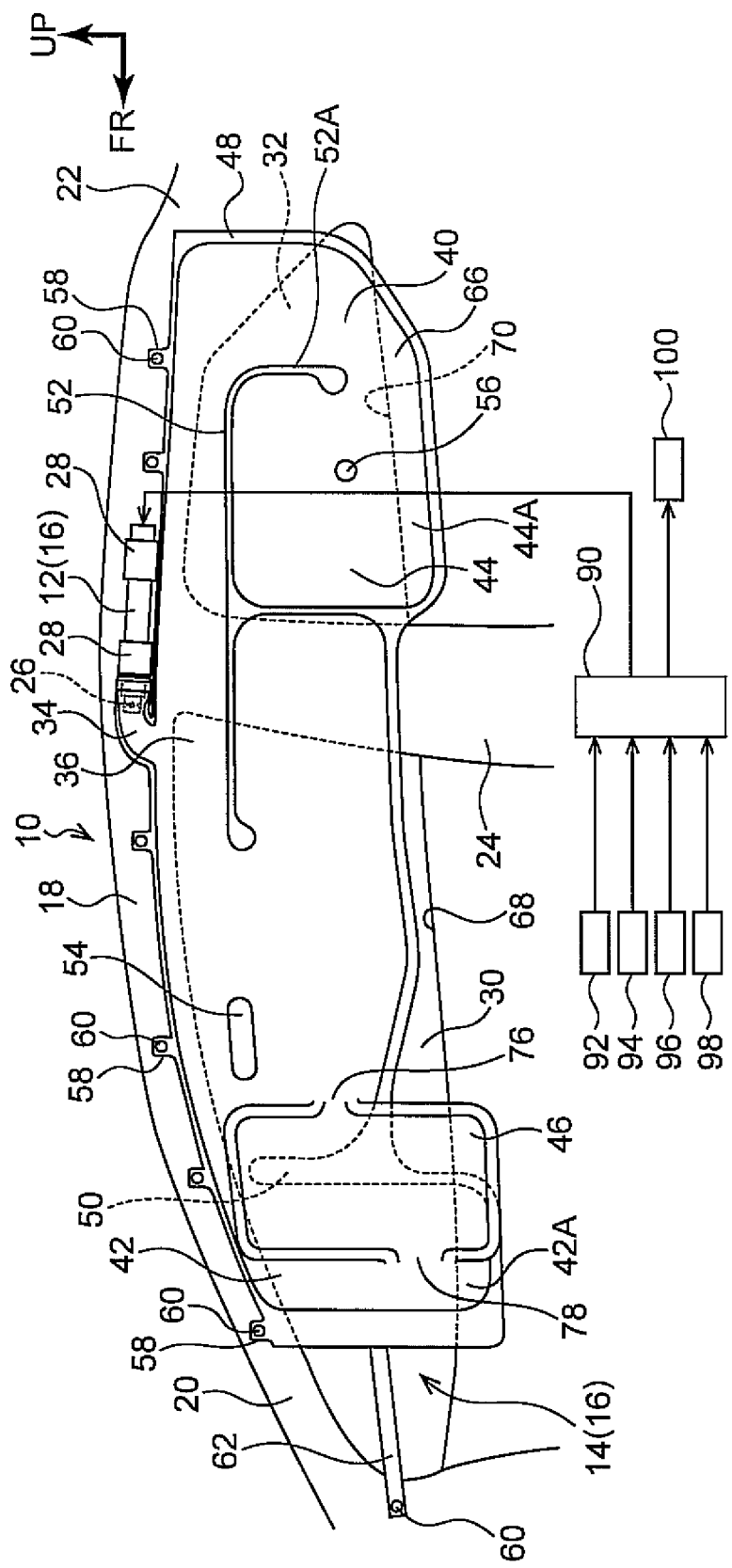
FIG. 1 is a side view as seen from inside a vehicle compartment, illustrating an actuated state of a vehicle curtain airbag device according to a first exemplary embodiment.
Figure 2:
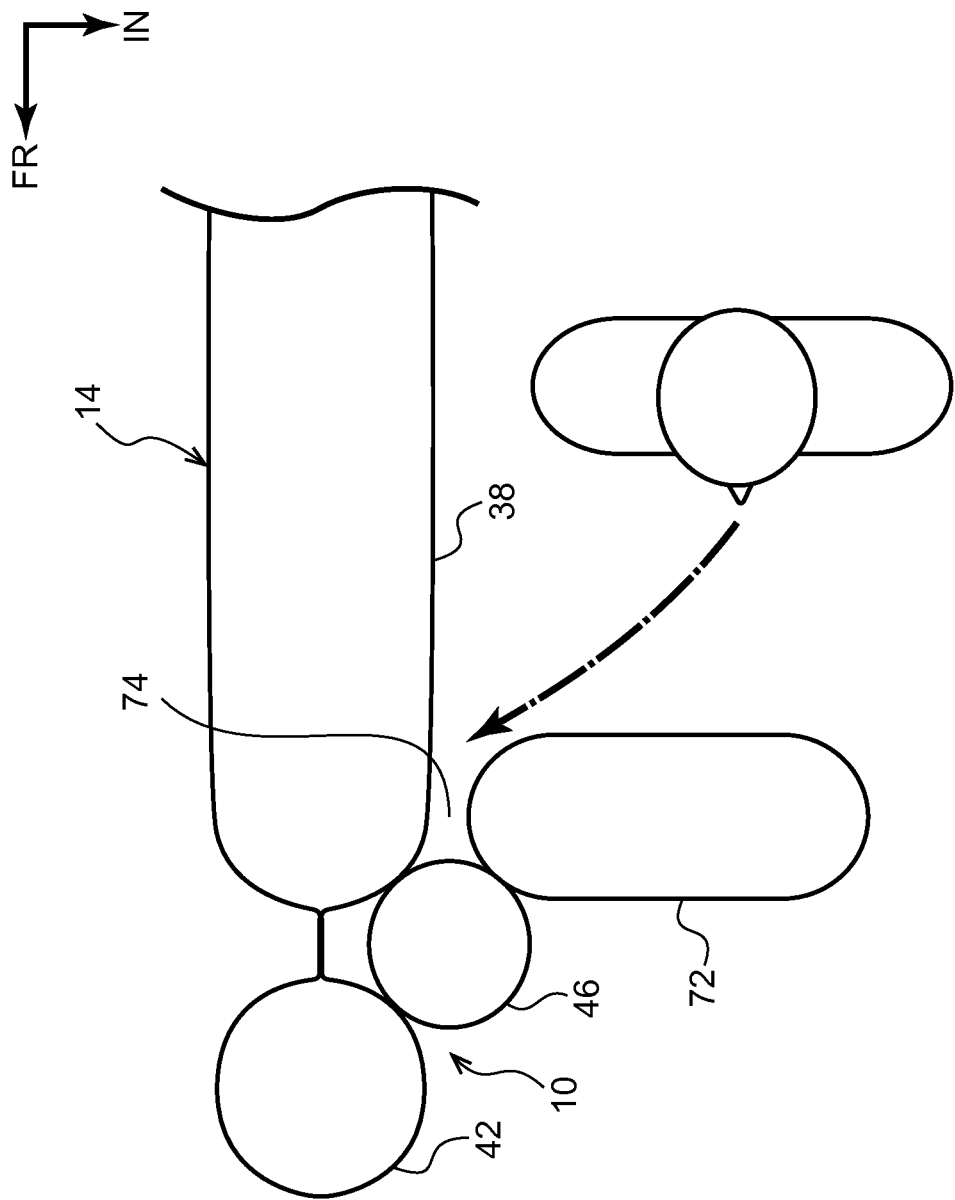
FIG. 2 is a schematic plan view illustrating a positional relationship between a curtain airbag and a driver's seat airbag, both in an inflated and deployed state, and a seated occupant in the event of a small overlap collision.
Figure 3:
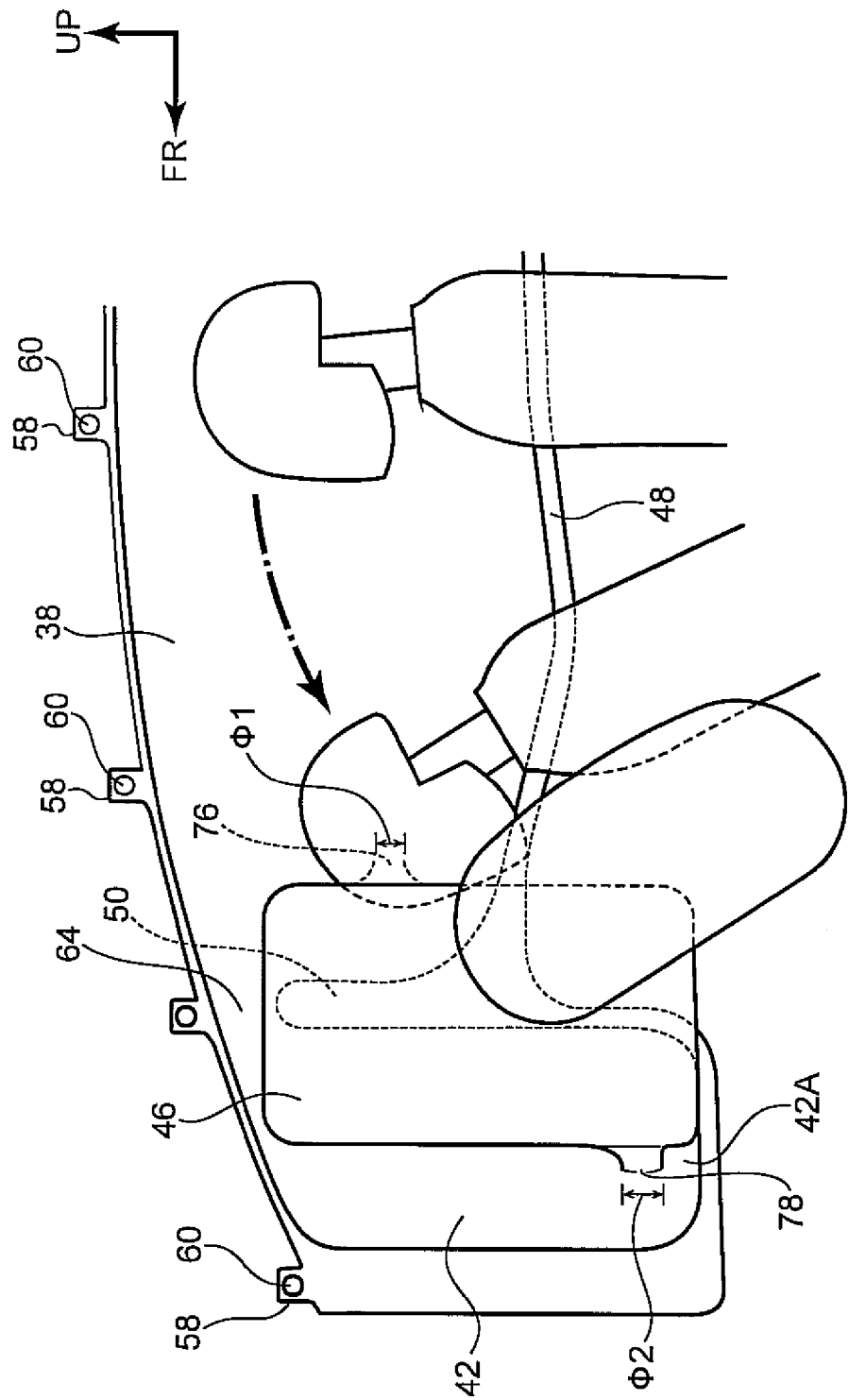
FIG. 3 is a side view of the state illustrated in FIG. 2 as seen from inside the vehicle compartment.

Explanation follows regarding a vehicle curtain airbag device of a first exemplary embodiment of the present invention with reference to FIG. 1 to FIG. 3. Note that in the drawings, the arrow FR indicates the vehicle front side, the arrow UP indicates the vehicle top side, and the arrow IN indicates the vehicle width direction inside as appropriate.

FIG. 1 is a side view as viewed from inside a vehicle compartment illustrating an actuated state of a vehicle curtain airbag device 10 according to the present exemplary embodiment. As illustrated in FIG. 1, the vehicle curtain airbag device 10 is equipped with an airbag module 16 configured including an inflator 12 that generates gas in the event of a side-on collision, and a curtain airbag 14 that is connected to the inflator 12 and that inflates and deploys on receipt of gas supplied from the inflator 12.

In a state prior to installation to a vehicle, the airbag module 16 is assembled with the curtain airbag 14 folded up as slender elongated member. The airbag module 16 is then housed in this state in a space between a roof side rail 18 and a vehicle width direction outside end portion of a roof headlining, not illustrated in the drawings, configuring a molded ceiling, in a space between a front pillar 20 and a front pillar garnish, not shown in the drawings, that is disposed at the vehicle cabin inside of the front pillar 20, and in a space between a rear pillar 22 and a rear pillar garnish, not illustrated in the drawings, disposed at the vehicle cabin inside of the rear pillar 22.

The inflator 12 is formed in a long, slender circular column shape, and is disposed with its axial direction along the vehicle front-rear direction to the vehicle upper side of a center pillar 24. Plural gas ejection holes 26 are formed at a leading end outer peripheral portion of the inflator 12. The inside of the inflator 12 is filled for example with a gas generating agent. A large quantity of gas is generated when the gas generating agent combusts, and this gas is ejected through the gas ejection holes 26. The inflator 12 configured as above is fixed to the roof side rail 18 through brackets 28.

In a side view of the vehicle, the curtain airbag 14 is configured as a cloth member having a substantially rectangular bag shape, and of a size capable of substantially covering both a side window 30 of a front seat (the driver's seat in the present example) and a side window 32 of a rear seat. To be more specific, the curtain airbag 14 includes: a gas introduction portion 34 into which the leading end side of the inflator 12 is inserted; a gas supply path 36 extending along an upper edge of the curtain airbag 14 in a straight line shape running along the vehicle front-rear direction; a front main chamber 38 that inflates and deploys to the vehicle width direction outside of the head of an occupant seated in the front seat (the driver in the present example) corresponding to a head protection area; a rear main chamber 40 that inflates and deploys to the vehicle width direction outside of the head of an occupant seated in the rear seat corresponding to a head protection area, a front delay chamber 42 provided adjacent to the front main chamber 38 to the vehicle front-rear direction front side; a rear delay chamber 44 provided adjacent to the rear main chamber 40 to the vehicle front-rear direction front side, and a sub chamber 46 additionally provided to the front main chamber 38.

Note that portions of the curtain airbag 14 other than those mentioned above configure non-inflating portions into which gas does not flow. Namely, a first non-inflating portion 48 is provided at an outer peripheral portion of the curtain airbag 14, and a second non-inflating portion 50 is configured extending along the vehicle up-down direction between the front main chamber 38 and the front delay chamber 42. The curtain airbag 14 is moreover configured with a substantially T shaped third non-inflating portion 52 that partitions the curtain airbag 14 into the front main chamber 38, the rear delay chamber 44 and the gas supply path 36. The curtain airbag 14 is further configured with a short fourth non-inflating portion 54 extending in a straight line shape in the vehicle front-rear direction at a location where the gas supply path 36 and the front main chamber 38 are connected together. A small, circular shaped fifth non-inflating portion 56 is formed at a substantially central portion of the rear delay chamber 44 of the curtain airbag 14.

The upper edge portion of the curtain airbag 14 is integrally formed with plural tabs 58 formed at an appropriate separation from each other. Each of the tabs 58 is formed in a rectangular tab shape, and is fixed to the vehicle body, for example to the roof side rail 18, by a fixing bolt or clip 60. One end portion of a strap shaped tension belt 62 is moreover attached to a front end portion of the curtain airbag 14. The other end portion of the tension belt 62 is fixed to the front pillar 20 by a fixing bolt or clip 60.

Further explanation is now given regarding each of the portions of the curtain airbag 14 to which gas is supplied. The gas introduction portion 34 is formed at a vehicle front-rear direction substantially central portion of the upper edge of the curtain airbag 14. The inflator 12 is connected to the gas introduction portion 34, such that gas generated by the inflator 12 is supplied through the gas introduction portion 34 into the curtain airbag 14. The gas introduction portion 34 is in communication with a vehicle front-rear direction intermediate portion of the gas supply path 36.

The front main chamber 38 is configured so as to inflate and deploy in a substantially circular column shape along the vehicle front-rear direction over a range spanning from the vicinity of a vehicle front-rear direction intermediate portion of the front seat side window 30 to overlap with the center pillar 24. The front delay chamber 42 is disposed at the vehicle front-rear direction front side of the front main chamber 38 with the second non-inflating portion 50 interposed therebetween. The front delay chamber 42 is formed so as to inflate in a circular column shape with length direction along the vehicle up-down direction. An upper end portion of the front delay chamber 42 and a front end portion of the gas supply path 36 are in communication with each other through a constricted portion 64.

The rear main chamber 40 is formed so as to inflate in a substantially circular column shape capable of covering a rear portion region of the rear seat side window 30. The rear delay chamber 44 is disposed at the vehicle front-rear direction front side of the rear main chamber 40, with a rear end downward portion 52A of the third non-inflating portion 52, that is substantially T shaped in side view, interposed therebetween. A lower portion of the rear delay chamber 44 and a lower portion of the rear main chamber 40 are in communication with each other through a constricted portion 66.

A lower end portion 42A of the front delay chamber 42 described above is set so as to overlap with a door beltline 68 in the vehicle up-down direction. Similarly, a lower end portion 44A of the rear delay chamber 44 is set so as to overlap with a door beltline 70 in the vehicle up-down direction.

Note that the sub chamber 46 is additionally provided to the front main chamber 38 described above. Detailed explanation follows regarding the sub chamber 46.

As illustrated in FIG. 1 to FIG. 3, the sub chamber 46 is formed so as to inflate in a circular column shape with length direction in the vehicle up-down direction. The sub chamber 46 is disposed so as to straddle the front main chamber 38 and the front delay chamber 42, and is configured so as to inflate and deploy such that it blocks off from the vehicle front side a gap 74 formed between a driver's seat airbag 72 (see FIG. 2 and FIG. 3) and the curtain airbag 14 (the front main chamber 38). In an inflated and deployed state of the curtain airbag 14, the sub chamber 46 is configured so as to inflate and deploy to take reaction force from the front delay chamber 42 that completes inflation and deployment later than the front main chamber 38.

The sub chamber 46 and the front main chamber 38 are in communication with each other through a first flow path 76 provided at a rear end upper portion of the sub chamber 46. Moreover, the sub chamber 46 and the front delay chamber 42 are in communication with each other through a second flow path 78 provided at a front end lower portion of the sub chamber 46. As illustrated in FIG. 3, the flow path cross-section dimension (the flow path diameter) $\phi 2$ of the second flow path 78 is set larger than the flow path cross-section dimension (the flow path diameter) $\phi 1$ of the first flow path 76.

Moreover, as illustrated in FIG. 1, actuation of the vehicle curtain airbag device 10 described above is controlled by a controller 90. Connected to an input side of the controller 90 are, for example, a front airbag sensor 92, a small overlap collision detection sensor 94, a side-on collision detection sensor 96, and a rollover detection sensor 98. The front airbag sensor 92 is disposed on for example a front side member and primarily detects full overlap collisions and offset collisions. The small overlap collision detection sensor 94 is for example disposed at a vehicle width direction outside portion (such as a curved corner portion) at a location where a front side member is connected to front bumper reinforcement. The side-on collision detection sensor 96 is for example disposed on the center pillar 24, and principally detects side-on collisions. The rollover detection sensor 98 is disposed in the vicinity of a vehicle body floor central portion and detects vehicle rollover. Connected to an output side of the controller 90 are (a squib, not illustrated in the drawings, of) the inflator 12 of the vehicle curtain airbag device 10 and (a squib, not illustrated in the drawings, of) an inflator 100 of a driver's seat airbag device.

Operation and Advantageous Effects of the Present Exemplary Embodiment

Explanation follows regarding operation and advantageous effects of the present exemplary embodiment.

In the event of a small overlap collision, an occupant seated in the driver's seat attempts to relatively move towards the vehicle diagonal front outside (the front pillar 20 side) under inertia.

In the event of a small overlap collision, the small overlap collision detection sensor 94 detects that a small overlap collision has occurred, and outputs a detection signal to the controller 90. Determination is made in the controller 90 as to whether or not the vehicle curtain airbag device 10 and the driver's seat airbag device should be actuated based on the input detection signal. When affirmative determination is made, a specific current is passed through both (the squib, not illustrated in the drawings, of) the inflator 12 of the vehicle curtain airbag device 10 and (the squib, not illustrated in the drawings, of) the inflator 100 of the driver's seat airbag device.

The inflator 12 of the vehicle curtain airbag device 10 is accordingly actuated and a large quantity of gas is generated. The generated gas is introduced from the gas introduction portion 34 and is supplied along the gas supply path 36 in the vehicle front-rear direction. As a result, the front main chamber 38 and the rear main chamber 40 inflate and deploy first. Next, gas is supplied from the gas supply path 36 into the front delay chamber 42 through the constricted portion 64. The front delay chamber 42 accordingly inflates and deploys later than the front main chamber 38. Similarly, gas is supplied from the rear main chamber 40 into the rear delay chamber 44 through the constricted portion 66. The rear delay chamber 44 accordingly inflates and deploys later than the rear main chamber 40.

The sub chamber 46 is in communication with the front main chamber 38 through the first flow path 76. A portion of the gas that has been supplied to the front main chamber 38 is accordingly supplied into the sub chamber 46 through the first flow path 76, inflating and deploying the sub chamber 46. As a result, as illustrated in FIG. 2 and FIG. 3, the sub chamber 46 of the curtain airbag 14 inflates and deploys in a state straddling the front main chamber 38 and the front delay chamber 42.

The driver's seat airbag 72 also inflates and deploys due to the driver's seat airbag device being actuated at the same time. In an inflated and deployed state of both the driver's seat airbag 72 and the curtain airbag 14, the sub chamber 46 is disposed so as to block off the gap 74 formed between the front main chamber 38 and the driver's seat airbag 72 from the vehicle front side. The head of the occupant seated in the driver's seat is accordingly borne and arrested by the sub chamber 46 even when the head of the occupant moving under inertia towards the vehicle diagonal front outside enters the gap 74 formed between the driver's seat airbag 72 and the front main chamber 38. The sub chamber 46 takes reaction force from the front delay chamber 42, thereby reducing the speed of movement under inertia of the head of the occupant.

In the event of a rollover, the rollover detection sensor 98 detects that a rollover has occurred. When a rollover detection signal has been input to the controller 90, only the vehicle curtain airbag device 10 is actuated. The front delay chamber 42 provided at the vehicle front side of the front main chamber 38 completes inflation and deployment later than the front main chamber 38. Similarly, the rear delay chamber 44 provided at the vehicle front-rear direction front side of the rear main chamber 40 completes inflation and deployment later than the rear main chamber 40. The lower end portion 42A of the front delay chamber 42 and the lower end portion 44A of the rear delay chamber 44 respectively overlap with the door beltline 68 and the door beltline 70 in the vehicle up-down direction. As a result, in the event of a rollover the inflated and deployed state of the front delay chamber 42 and the rear delay chamber 44 is maintained, thereby preventing or suppressing the occupant seated in the driver's seat and an occupant seated in the rear seat from being ejected from the vehicle.

In the vehicle curtain airbag device 10 according to the present exemplary embodiment described above, occupant protection performance can be secured both in the event of a rollover, and in the event of a small overlap collision.

Moreover, in the present exemplary embodiment, the sub chamber 46 is disposed so as to straddle the front main chamber 38 and the front delay chamber 42. Accordingly, the sub chamber 46 does not get inside the gap 74 between the driver's seat airbag 72 and the front main chamber 38, and the sub chamber 46 blocks off the gap 74 from the vehicle front side. Large displacement of the driver's seat airbag 72 towards the vehicle width direction inside caused by the sub chamber 46 accordingly does not occur. Moreover, since the sub chamber 46 is inflated and deployed to take the reaction force from the front delay chamber 42, the acceleration of the head of the seated occupant can be sufficiently reduced. According to the present exemplary embodiment, it is therefore possible to increase the protection performance with respect to the head of the seated occupant whilst maintaining good performance of the driver's seat airbag 72.

Moreover, in the present exemplary embodiment, the sub chamber 46 and the front main chamber 38 are in communication with each other through the first flow path 76. The sub chamber 46 accordingly inflates and deploys due to a portion of the gas that has been supplied to the front main chamber 38 being supplied to the sub chamber 46 through the first flow path 76. The time taken for inflation and deployment of the sub chamber 46 to complete can accordingly be varied by setting the flow path cross-section dimension 1 of the first flow path 76. As a result, according to the present exemplary embodiment, the sub chamber 46 can be made to inflate and deploy in an appropriate manner whilst swiftly inflating and deploying the front main chamber 38.

In the present exemplary embodiment, the sub chamber 46 and the front delay chamber 42 are in communication with each other through the second flow path 78. A portion of the gas that has been supplied into the front delay chamber 42 is accordingly also supplied into the sub chamber 46. As a result, according to the present exemplary embodiment, the sub chamber 46 can be made to inflate and deploy swiftly.

In the present exemplary embodiment, the flow path cross-section dimension $\phi 2$ of the second flow path 78 is set larger than the flow path cross-section dimension $\phi 1$ of the first flow path 76. It is accordingly possible to secure a gas escape space in the event of a side-on collision with for example a pole or a barrier, in addition to the operation and advantageous effects in the event of a small overlap collision. Namely, in the event of a side-on collision with a pole or a barrier, gas inside the front main chamber 38 is allowed to escape into the sub chamber 46 through the first flow path 76, and gas inside the sub chamber 46 can moreover efficiently escape into the front delay chamber 42 through the second flow path 78. Accordingly, in the present exemplary embodiment the reaction force received by the head of a seated occupant from the front main chamber 38 in the event of a side-on collision with for example a pole or a barrier can be effectively reduced.

Second Exemplary Embodiment

Figure 4:
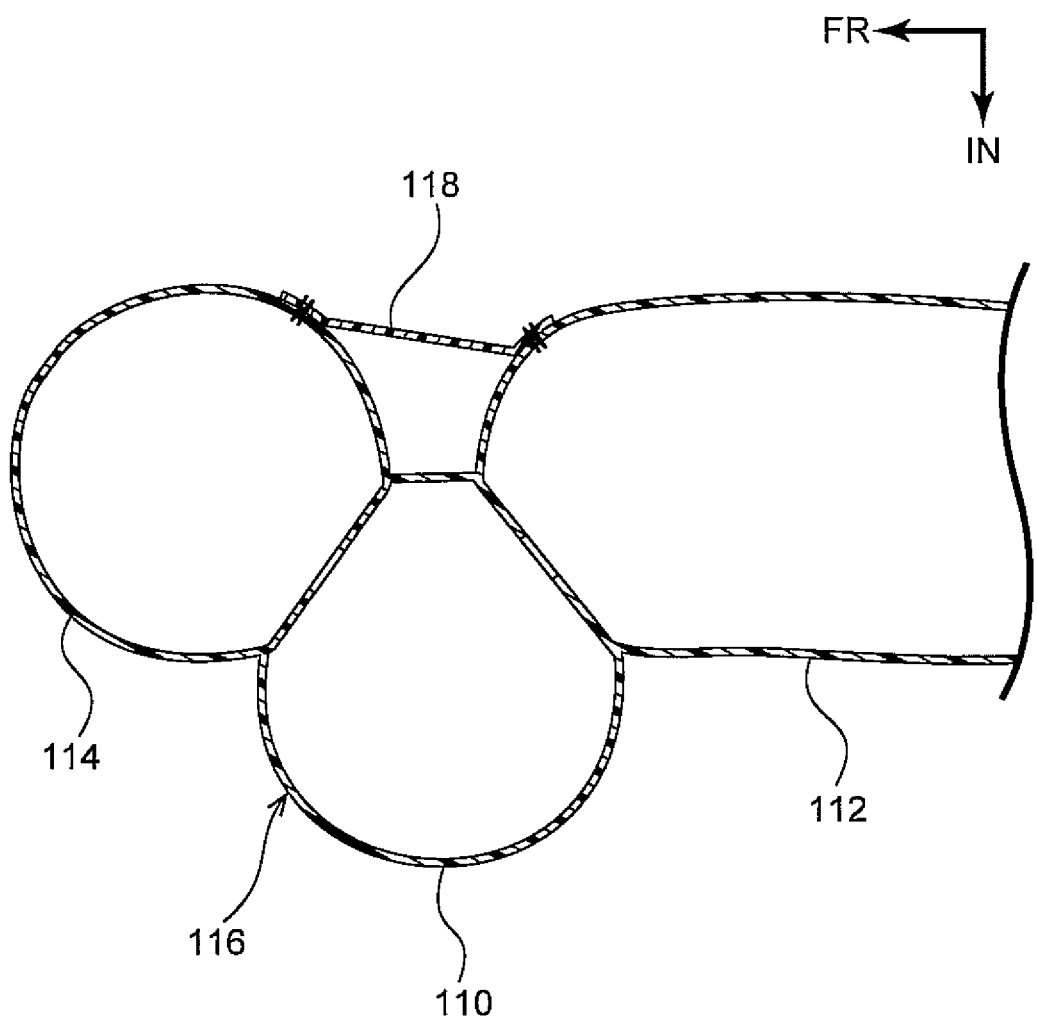
FIG. 4 is an enlarged plan view cross-section illustrating relevant portions of a curtain airbag of a vehicle curtain airbag device according to a second exemplary embodiment.

Explanation follows regarding a vehicle curtain airbag device according to a second exemplary embodiment of the present invention, with reference to FIG. 4.

As illustrated in FIG. 4, in the second exemplary embodiment a curtain airbag 116 includes a sub chamber 110, a front main chamber 112, a front delay chamber 114, and also a rear main chamber and a rear delay chamber, neither of which are illustrated in the drawings. The overall curtain airbag 116 is integrally pocket woven using what is known as a one-piece woven (OPW) method. The OPW curtain airbag 116 is a pocket shaped non-stitched bag manufactured by weaving two pieces of cloth at the same time with connecting weaving at the required locations, on a Jacquard loom.

The vicinities of a front end portion of the front main chamber 112 and a rear end portion of the front delay chamber 114 are coupled together in the vehicle front-rear direction by a strap 118 at the vehicle width direction outside of the sub chamber 110. A front end portion of the strap 118 is sewn to the front delay chamber 114, and a rear end portion of the strap 118 is sewn to the front main chamber 112. Note that in the present exemplary embodiment, configuration is made with the strap 118, however there is no limitation thereto, and the strap 118 may be omitted.

Operation and Advantageous Effects

According to the configuration described above, the sub chamber 110 is integrally pocket woven together with the front main chamber 112 and the front delay chamber 114 using a one-piece woven method. Accordingly, relative movement does not occur between the sub chamber 110 and the front main chamber 112 and the front delay chamber 114 even when the head of a seated occupant is borne and arrested by the sub chamber 110 in the event of a small overlap collision. The seated occupant can accordingly receive an effective reaction force from the sub chamber 110. Moreover, according to the present exemplary embodiment, manufacture of the curtain airbag is easy and gas leakage is not liable to occur. As a result, a sufficient reaction force can be obtained from the sub chamber 110 in the event of a small overlap collision, the manufacturing cost of the second clutch 116 can be reduced and the good rollover performance can also be exhibited.

Third Exemplary Embodiment

Figure 5A:
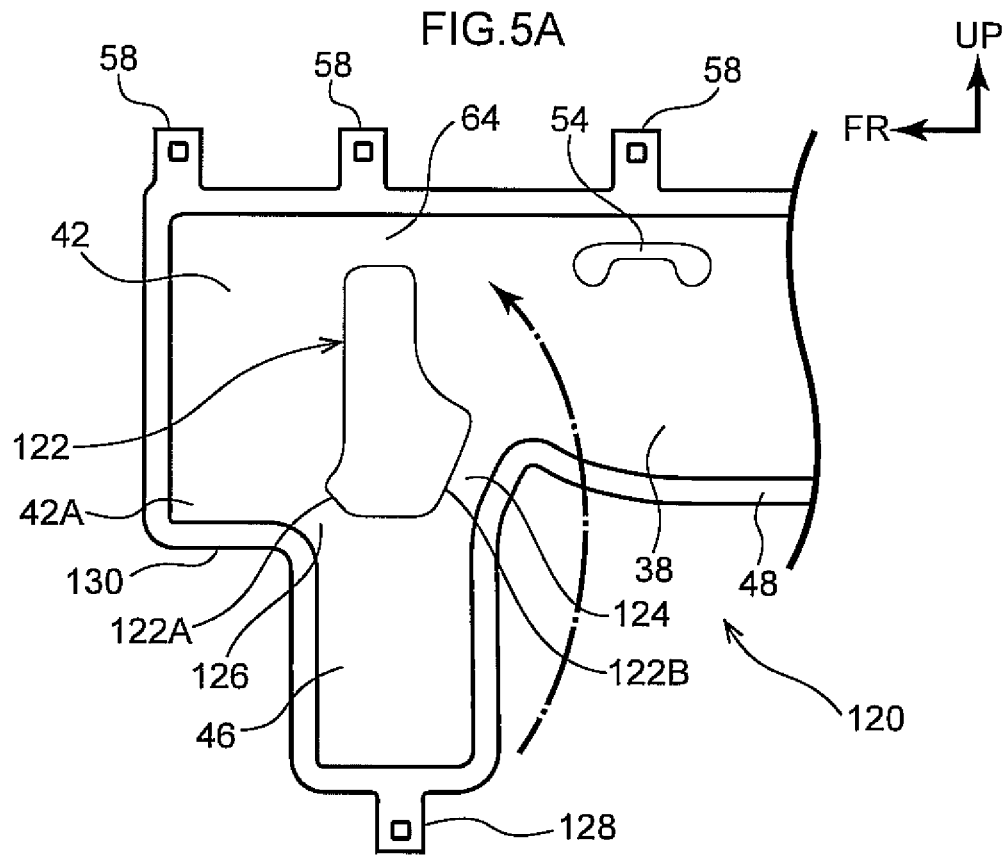
FIG. 5A is a plan view illustrating a curtain airbag of a vehicle curtain airbag device according to a third exemplary embodiment when opened out flat as a single body.
Figure 5B:
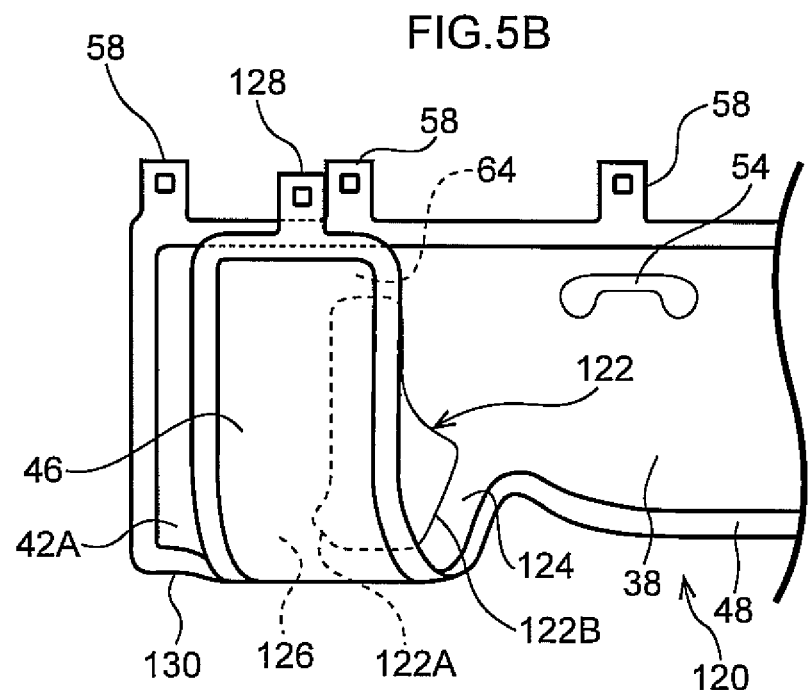
FIG. 5B is a plan view illustrating a state in which a sub chamber has been folded over from the state illustrated in FIG. 5A.

Explanation follows regarding a vehicle curtain airbag device according to a third exemplary embodiment of the present invention, with reference to FIG. 5A and FIG. 5B. Note that configuration portions similar to those of the first exemplary embodiment described above are allocated the same reference numerals and further explanation thereof is omitted.

As illustrated in FIG. 5A and FIG. 5B, in the third exemplary embodiment the sub chamber 46 is formed so as to be folded and bent over. More specifically, when opened out flat as a single body, a curtain airbag 120 is formed with a substantially rectangular non-inflating portion 122 at the vehicle front-rear direction front side of the front main chamber 38, and the front delay chamber 42 is further formed to the vehicle front-rear direction front side of the non-inflating portion 122. The sub chamber 46 is moreover integrally formed to the vehicle up-down direction lower side of the non-inflating portion 122. Namely, the sub chamber 46 is formed at the opposite side of a lower edge 130 of the front main chamber 38 and the front delay chamber 42 to the front main chamber 38 and the front delay chamber 42.

A lower portion of the non-inflating portion 122 is configured with a shape that bulges out in the vehicle front and rear directions with respect to an upper portion of the non-inflating portion 122, and includes a lower edge front portion 122A that is inclined from a front end of the lower edge towards the vehicle up-down direction upper side and the vehicle front-rear direction front side, and a lower edge rear portion 122B that is inclined from a rear end of the lower edge towards the vehicle up-down direction upper side and the vehicle front-rear direction rear side. The front main chamber 38 and the sub chamber 46 are in communication with each other through a first flow path 124 formed along the lower edge rear portion 122B. The front delay chamber 42 and the sub chamber 46 are in communication with each other through a second flow path 126 formed along the lower edge front portion 122A. Note that in the present exemplary embodiment, the flow path cross-section dimension of the first flow path 124 and the flow path cross-section dimension of the second flow path 126 are set so as to the same as each other.

A tab 128 is provided at a lower edge central portion of the sub chamber 46 in the state illustrated in FIG. 5A. As illustrated in FIG. 5B, the sub chamber 46 is folded over at the lower edge side of the front delay chamber 42, with the sub chamber 46 side tab 128 overlapping with the tab 58 provided above the non-inflating portion 122, with these two tabs integrally fixed to the roof side rail 18 with a single fixing bolt or clip 60. Note that the folded over sub chamber 46 is installed to the vehicle so as to be disposed at the vehicle width direction inside of the front main chamber 38 and the front delay chamber 42.

Operation and Advantageous Effects

According to the configuration described above, as illustrated in FIG. 5A, when the curtain airbag 120 is opened out flat as a single body, the sub chamber 46 is disposed on the opposite side of the lower edge 130 of the front main chamber 38 and the front delay chamber 42 to the front main chamber 38 and the front delay chamber 42. As illustrated in FIG. 5B, the sub chamber 46 is folded over towards the side of the front main chamber 38 and the front delay chamber 42, with the lower edge 130 of the front delay chamber 42 as a fold line (crease line). The sub chamber 46-side tab 128 and the tab 58 above the non-inflating portion 122 are overlapped and aligned with each other, and the two tabs are integrally fixed to the roof side rail 18 with a single fixing bolt or clip 60.

Accordingly, in the present exemplary embodiment, when the curtain airbag 120 is opened out flat as a single body, the sub chamber 46 is formed in the same plane as the front main chamber 38 and the front delay chamber 42. Simple manufacture of the curtain airbag 120 can thereby be achieved. Gas leakage is moreover less liable to occur than in a configuration wherein a pre-manufactured sub chamber is for example integrated by sewing onto a curtain airbag main body portion. As a result, according to the present exemplary embodiment the manufacturing cost of the curtain airbag 120 can be lowered whilst exhibiting good occupant protection performance in the event of a small overlap collision.

Supplementary Explanation of the Above Exemplary Embodiments

In each of the exemplary embodiments described above, the designated small overlap collision detection sensor 94 for detecting a small overlap collision state is provided at a vehicle body front portion, however there is no requirement for a designated small overlap collision detection sensor to be provided at the vehicle body front portion. Configuration may be made wherein a controller determines that a small overlap collision has occurred based on detection signals of a single or plural existing collision detection sensors installed to the vehicle.

In each of the exemplary embodiments described above, the sub chamber 46 is disposed so as to straddle the front main chamber 38 and the front delay chamber 42, however there is no limitation thereto, and in the relationship of the first aspect, any configuration may be made such that the gap 74 is blocked off from the vehicle front side.

In the each of the exemplary embodiments described above, the sub chamber 46, 110 and the front main chamber 38, 112 are in communication with each other through the first flow path 76, 124, such that gas supply is received from the front main chamber 38, 112 however there is no limitation thereto. The gas supply path may be extended as far as the sub chamber 46, 110 side and be in direct communication with the sub chamber 46, 116.

What is claimed is:

1. A vehicle curtain airbag device comprising:
   a curtain airbag including
      a main chamber that inflates and deploys to a vehicle width direction inside of a driver's seat-side side window due to being supplied with gas from an inflator installed to a vehicle,
      a delay chamber that is provided at a vehicle front-rear direction front side of the main chamber, and that completes inflation and deployment later than the main chamber upon receipt of the gas supply, and
      a sub chamber that, due to being inflated and deployed in the vehicle width direction inside of the main chamber, blocks off, from a vehicle front side, a gap formed between the main chamber and a driver's seat airbag that is inflated and deployed from a steering wheel; and
   a controller that inflates and deploys the driver's seat airbag and actuates the inflator in the event of a small overlap collision.

2. The vehicle curtain airbag device of claim 1, wherein the sub chamber is disposed so as to straddle the main chamber and the delay chamber, and the sub chamber is configured so as to inflate and deploy to take a reaction force from the delay chamber.

3. The vehicle curtain airbag device of claim 2, wherein the sub chamber and the main chamber are in communication with each other through a first flow path.

4. The vehicle curtain airbag device of claim 1, wherein the sub chamber and the main chamber are in communication with each other through a first flow path.

5. The vehicle curtain airbag device of claim 4, wherein the sub chamber and the delay chamber are in communication with each other through a second flow path.

6. The vehicle curtain airbag device of claim 5, wherein a flow path cross-section dimension of the second flow path is set larger than a flow path cross-section dimension of the first flow path.

7. The vehicle curtain airbag device of claim 1, wherein the sub chamber is integrally pocket woven with the main chamber and the delay chamber using a one-piece woven method.

8. The vehicle curtain airbag device of claim 1, wherein:
   when the curtain airbag is opened out flat as a single body, the sub chamber is formed at an opposite side of a lower edge of the main chamber and the delay chamber from the main chamber and the delay chamber; and
   the sub chamber is folded over at a lower edge side of the main chamber, the delay chamber or both the main chamber and the delay chamber, with an upper edge side of the sub chamber fixed to the vehicle body side together with an upper edge side of the main chamber and the delay chamber, such that the sub chamber is disposed at the vehicle width direction inside of the main chamber and the delay chamber when the curtain airbag has been inflated and deployed.

* * * * *